United States Patent
Zeine et al.

(10) Patent No.: US 10,523,034 B2
(45) Date of Patent: Dec. 31, 2019

(54) EMBEDDED OR DEPOSITED SURFACE ANTENNAS FOR INTEGRATED WIRELESS POWER FACILITIES

(71) Applicant: Ossia Inc., Bellevue, WA (US)

(72) Inventors: Hatem Zeine, Bellevue, WA (US); Anas Alfarra, Bellevue, WA (US); Alireza Saghati, Bellevue, WA (US)

(73) Assignee: Ossia Inc., Bellevue, WA (US)

( * ) Notice: Subject to any disclaimer, the term of this patent is extended or adjusted under 35 U.S.C. 154(b) by 822 days.

(21) Appl. No.: 15/047,577

(22) Filed: Feb. 18, 2016

(65) Prior Publication Data
US 2016/0248270 A1    Aug. 25, 2016

Related U.S. Application Data

(60) Provisional application No. 62/118,381, filed on Feb. 19, 2015.

(51) Int. Cl.
| | | |
|---|---|---|
| *H02J 50/20* | (2016.01) | |
| *H02J 7/02* | (2016.01) | |
| *H02J 7/00* | (2006.01) | |
| *H02J 7/35* | (2006.01) | |

(Continued)

(52) U.S. Cl.
CPC ............ *H02J 7/025* (2013.01); *H02J 7/0042* (2013.01); *H02J 7/0047* (2013.01); *H02J 7/0054* (2013.01); *H02J 7/35* (2013.01); *H02J 50/20* (2016.02); *H02J 50/23* (2016.02); *H02J 50/27* (2016.02)

(58) Field of Classification Search
CPC . G06F 15/00; H01Q 3/34; H01Q 1/40; H01Q 3/26
See application file for complete search history.

(56) References Cited

U.S. PATENT DOCUMENTS

| | | | |
|---|---|---|---|
| 9,709,835 B2 * | 7/2017 | Hohshi | ................... H01F 38/14 |
| 2006/0281435 A1 * | 12/2006 | Shearer | ............. G06K 19/0707 |
| | | | 455/343.1 |
| 2009/0167699 A1 | 7/2009 | Rosenblatt et al. | |

(Continued)

FOREIGN PATENT DOCUMENTS

| | | |
|---|---|---|
| JP | 2009-253763 A | 10/2009 |
| JP | 2012-213251 A | 11/2012 |

OTHER PUBLICATIONS

Japanese Patent Application No. 2017-543801, Office Action, 10 pages, dated Oct. 30, 2018.

(Continued)

*Primary Examiner* — Jared Fureman
*Assistant Examiner* — Emmanuel Dominique

(57) ABSTRACT

Embodiments of the present disclosure describe various techniques for integrating wireless power facilities or functionality into an existing object or device via embedded or deposited surface antennas. More specifically, the techniques described herein provide for the ability to embed and/or otherwise deposit spatially-arrayed adaptively-phased antennas on the surface of an existing object or device such that the antennas are exposed to air and/or otherwise lacking significant interference. In some embodiments, a wireless power control system is operatively coupled to the antennas to independently control phases of the phased of the antennas in a wireless power delivery environment.

20 Claims, 18 Drawing Sheets

(51) Int. Cl.
*H02J 50/27* (2016.01)
*H02J 50/23* (2016.01)

(56) References Cited

U.S. PATENT DOCUMENTS

| | | | |
|---|---|---|---|
| 2009/0237320 A1* | 9/2009 | Higashi | H01L 28/10 |
| | | | 343/850 |
| 2010/0315045 A1 | 12/2010 | Zeine | |
| 2011/0157137 A1* | 6/2011 | Ben-Shalom | G02F 1/1333 |
| | | | 345/211 |
| 2012/0069506 A1* | 3/2012 | Lai | H02J 7/0044 |
| | | | 361/679.01 |
| 2012/0299389 A1 | 11/2012 | Lee et al. | |
| 2013/0021289 A1* | 1/2013 | Chen | G06F 1/1601 |
| | | | 345/174 |
| 2013/0061905 A1 | 3/2013 | Gaud et al. | |
| 2014/0015337 A1 | 1/2014 | Takeuchi et al. | |
| 2014/0015344 A1 | 1/2014 | Mohamadi | |
| 2014/0049882 A1* | 2/2014 | Lin | G06F 1/1601 |
| | | | 361/679.01 |
| 2014/0078449 A1 | 3/2014 | Hassan et al. | |
| 2014/0106684 A1* | 4/2014 | Burns | H01Q 1/243 |
| | | | 455/78 |
| 2014/0176983 A1 | 6/2014 | Jose et al. | |
| 2014/0203663 A1* | 7/2014 | Waffenschmidt | H02J 5/005 |
| | | | 307/109 |
| 2014/0232185 A1* | 8/2014 | Sempel | H02J 50/12 |
| | | | 307/11 |
| 2015/0029397 A1* | 1/2015 | Leabman | H04N 21/43637 |
| | | | 348/552 |
| 2016/0100124 A1* | 4/2016 | Leabman | H04N 5/63 |
| | | | 348/730 |

OTHER PUBLICATIONS

European Patent Application No. 16753088.0, Extended European Search Report, 9 pages, dated Oct. 16, 2018.

* cited by examiner

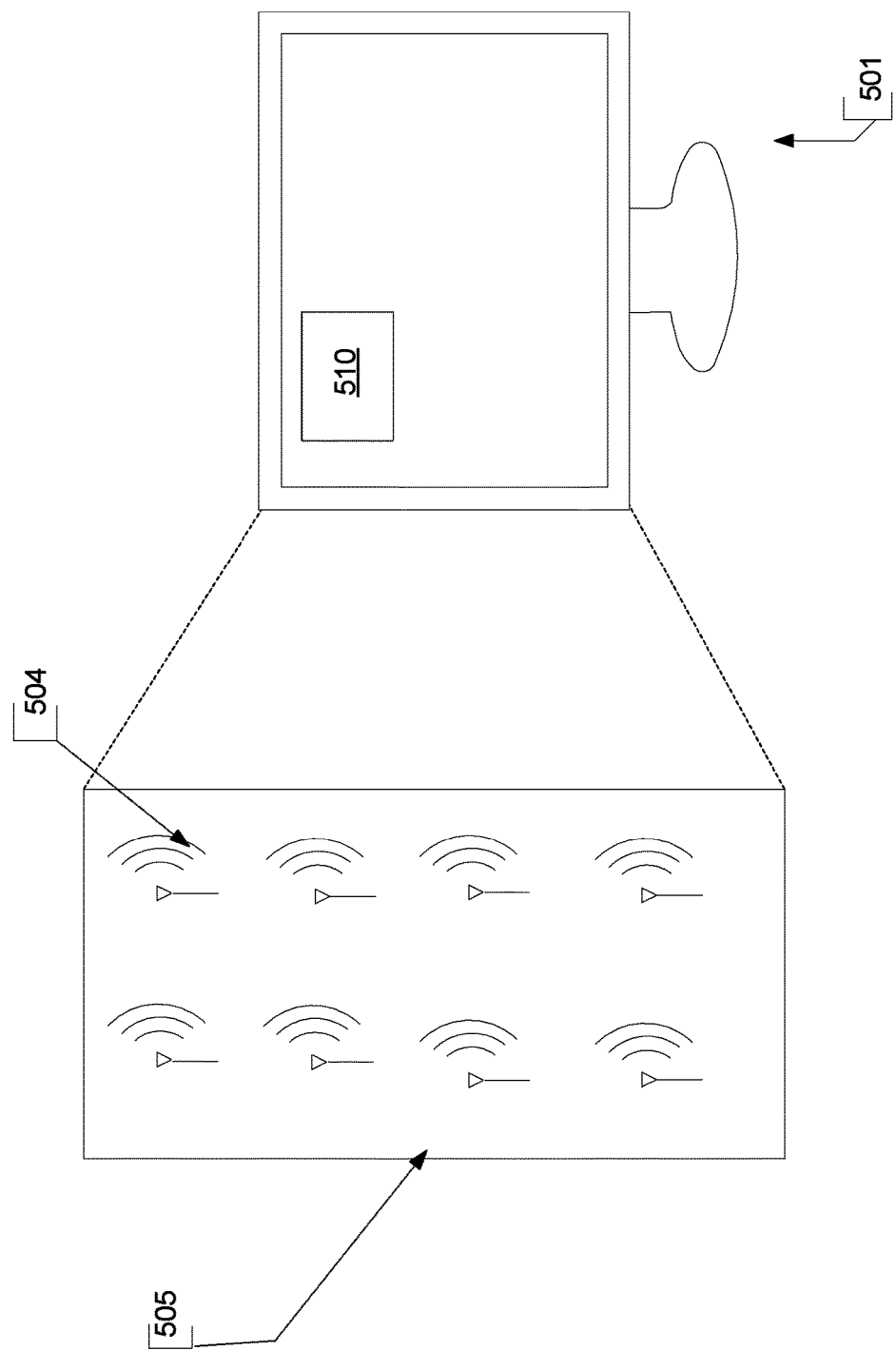

EMBEDDED OR DEPOSITED SURFACE ANTENNAS FOR INTEGRATED WIRELESS POWER FACILITIES

CROSS-REFERENCE TO RELATED APPLICATIONS

This application claims priority to and benefit from U.S. Provisional Patent Application Ser. No. 62/211,381 titled "Embedded or Deposited Surface Antennas for Wireless Power Delivery via Existing Objects," filed on Feb. 19, 2015, which is expressly incorporated by reference herein.

BACKGROUND

Wireless power transmission systems typically comprise a standalone or discrete wireless charger unit. These wireless power transmission systems perform optimally when the antennas are spatially diverse (e.g., antenna distributed over a large surface area) and not in a single plane. That is, the transmission efficiency of a phased array transmitter is proportional to the number of antennas in the array. For example, to transmit at high efficiency using a 2.4 GHz signal at a distance of five meters, one would theoretically need approximately one million antennas in the array to reach efficiencies greater than 90%. However, placing one million antennas within roughly the same distance of five meters from the target is a challenge as each antenna requires a volume of space to prevent it from directly coupling with neighboring antennas. Consequently, the size of the array can become very large.

Various techniques for reducing the size of the array (or wireless charger) have been disclosed. For example, U.S. patent application Ser. No. 14/461,332, which is incorporated by reference in its entirety herein, discusses a high dielectric antenna with a reduced form factor. However, even with a reduced form factor, a standalone or discrete wireless charger unit can only be so large without becoming unsightly and/or otherwise unwieldy.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIG. 5B illustrates a more detailed example of the television or monitor device in accordance with some embodiments.

DETAILED DESCRIPTION

Figure 1:
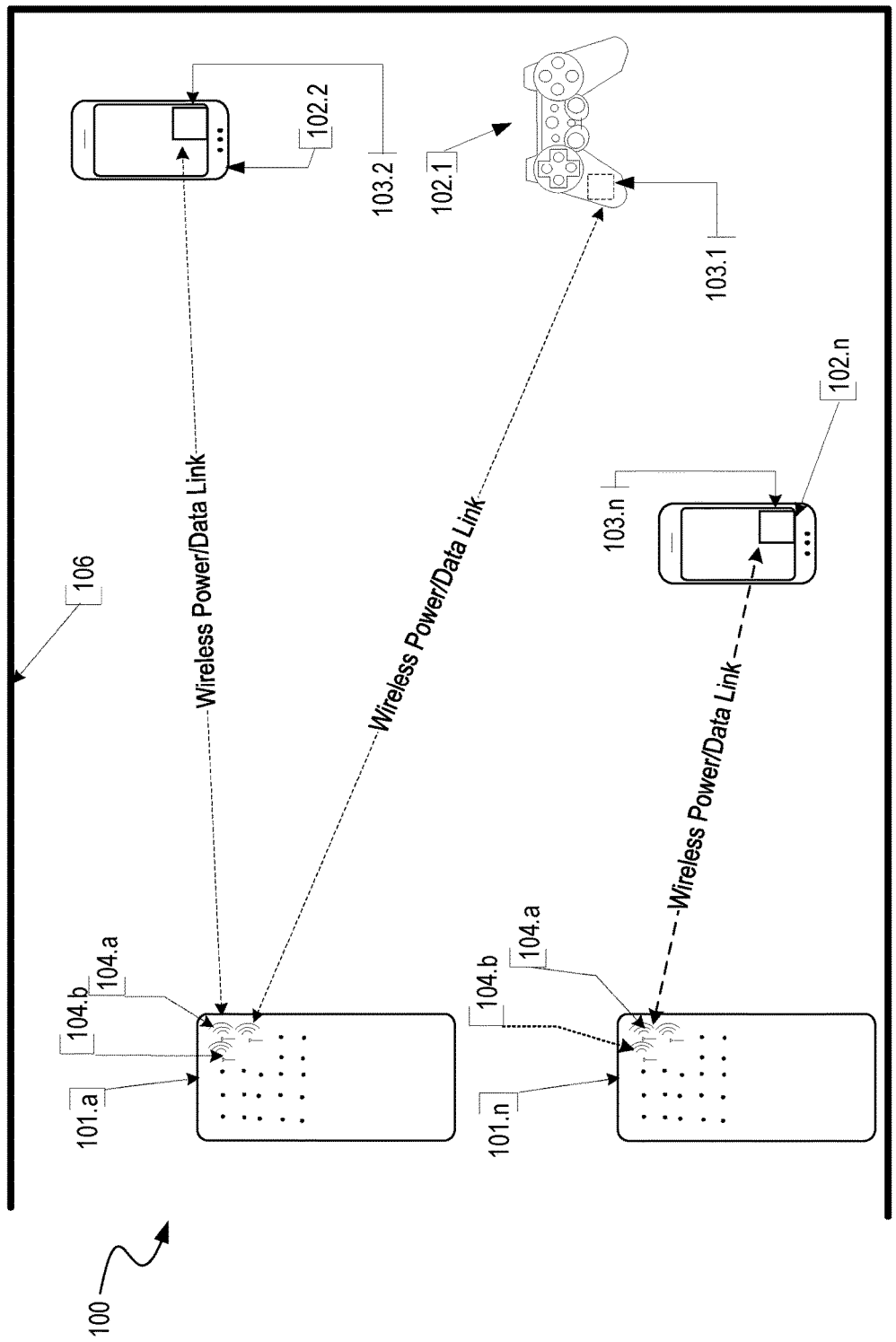
FIG. 1 depicts a block diagram illustrating an example wireless power delivery environment depicting wireless power delivery from one or more wireless chargers to various wireless devices within the wireless power delivery environment.

Embodiments of the present disclosure describe various techniques for integrating wireless power facilities or functionality into existing objects via embedded or deposited surface antennas. More specifically, the techniques described herein provide for the ability to embed and/or otherwise deposit spatially arrayed, adaptively-phased antennas on the surface of an existing object or device such that the antennas are exposed to air and/or otherwise lacking significant interference. In some embodiments, a wireless power control system is operatively coupled to the antennas to independently control phases of the phased of the antennas in a wireless power delivery environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

I. Example Wireless Power Delivery System Overview/Architecture

FIG. 1 is a diagram illustrating an example wireless power delivery environment 100 depicting wireless power delivery from one or more wireless chargers 101 to various wireless devices 102 within the wireless power delivery environment 100. More specifically, FIG. 1 illustrates an example wireless power delivery environment 100 in which wireless power and/or data can be delivered to available wireless devices 102.1-102.n having one or more power receiver clients 103.1-103.n (also referred to herein as "wireless power receivers" or "wireless power clients"). The wireless power receivers are configured to receive isolated wireless power from one or more wireless chargers 101.

As shown in the example of FIG. 1, the wireless devices 102.1-102.n are mobile phone devices 102.2 and 102.n, respectively, and a wireless game controller 102.1, although the wireless devices 102.1-102.n can be any (smart or dumb) wireless device or system that needs power and is capable of receiving wireless power via one or more integrated power receiver clients 103.1-103.n. As discussed herein, the one or more integrated power receiver clients or "wireless power receivers" receive and process power from one or more transmitters/chargers 101.a-101.n and provide the power to the wireless devices 102.1-102.n for operation thereof.

Each charger 101 (also referred to herein as a "transmitter", "array of antennas" or "antenna array system") can include multiple antennas 104, e.g., an antenna array including hundreds or thousands of antennas, which are capable of delivering wireless power to wireless devices 102. In some embodiments, the antennas are adaptively-phased radio frequency antennas. The charger 101 is capable of determining the appropriate phases to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein he term "array" or "array system" may be used include related and peripheral circuitry for signal generation, reception and transmission, such as radios, digital logic and modems. In some embodiments, the charger 101 can have an embedded Wi-Fi hub.

The wireless devices 102 can include one or more receive power clients 103. As illustrated in the example of FIG. 1, power delivery antennas 104a and data communication antennas 104b are shown. The power delivery antennas 104a are configured to provide delivery of wireless radio frequency power in the wireless power delivery environment. The data communication antennas are configured to send data communications to and receive data communications from the power receiver clients 103.1-103 and/or the wireless devices 102.1-102.n. In some embodiments, the data communication antennas can communicate via Bluetooth, Wi-Fi, ZigBee, etc.

Each power receiver client 103.1-103.n includes one or more antennas (not shown) for receiving signals from the chargers 101. Likewise, each charger 101.a-101.n includes an antenna array having one or more antennas and/or sets of antennas capable of emitting continuous wave signals at specific phases relative to each other. As discussed above, each array is capable of determining the appropriate phases for delivering coherent signals to the power receiver clients 102.1-102.n. For example, coherent signals can be determined by computing the complex conjugate of a received beacon signal at each antenna of the array such that the coherent signal is properly phased for the particular power receiver client that transmitted the beacon signal.

Although not illustrated, each component of the environment, e.g., wireless power receiver, charger, etc., can include control and synchronization mechanisms, e.g., a data communication synchronization module. The chargers 101.a-101.n can be connected to a power source such as, for example, a power outlet or source connecting the chargers to a standard or primary alternating current (AC) power supply in a building. Alternatively or additionally, one or more of the chargers 101.a-101.n can be powered by a battery or via other mechanisms.

In some embodiments, the power receiver clients 102.1-102.n and/or the chargers 101.a-101.n utilize reflective objects 106 such as, for example, walls or other RF reflective obstructions within range to transmit beacon signals and/or receive wireless power and/or data within the wireless power delivery environment. The reflective objects 106 can be utilized for multi-directional signal communication regardless of whether a blocking object is in the line of sight between the charger and the power receiver client.

As described herein, each wireless device 102.1-102.n can be any system and/or device, and/or any combination of devices/systems that can establish a connection with another device, a server and/or other systems within the example environment 100. In some embodiments, the wireless devices 102.1-102.n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the charger 101 and the power receiver clients 103.1-103.n can each include a data communication module for communication via a data channel. Alternatively or additionally, the power receiver clients 103.1-103.n can direct the wireless devices 102.1-102.n to communicate with the charger via existing data communications modules. Additionally, in some embodiments the beacon signal, which is primarily referred to herein as a continuous waveform, can alternatively or additionally take the form of a modulated signal.

Figure 2:
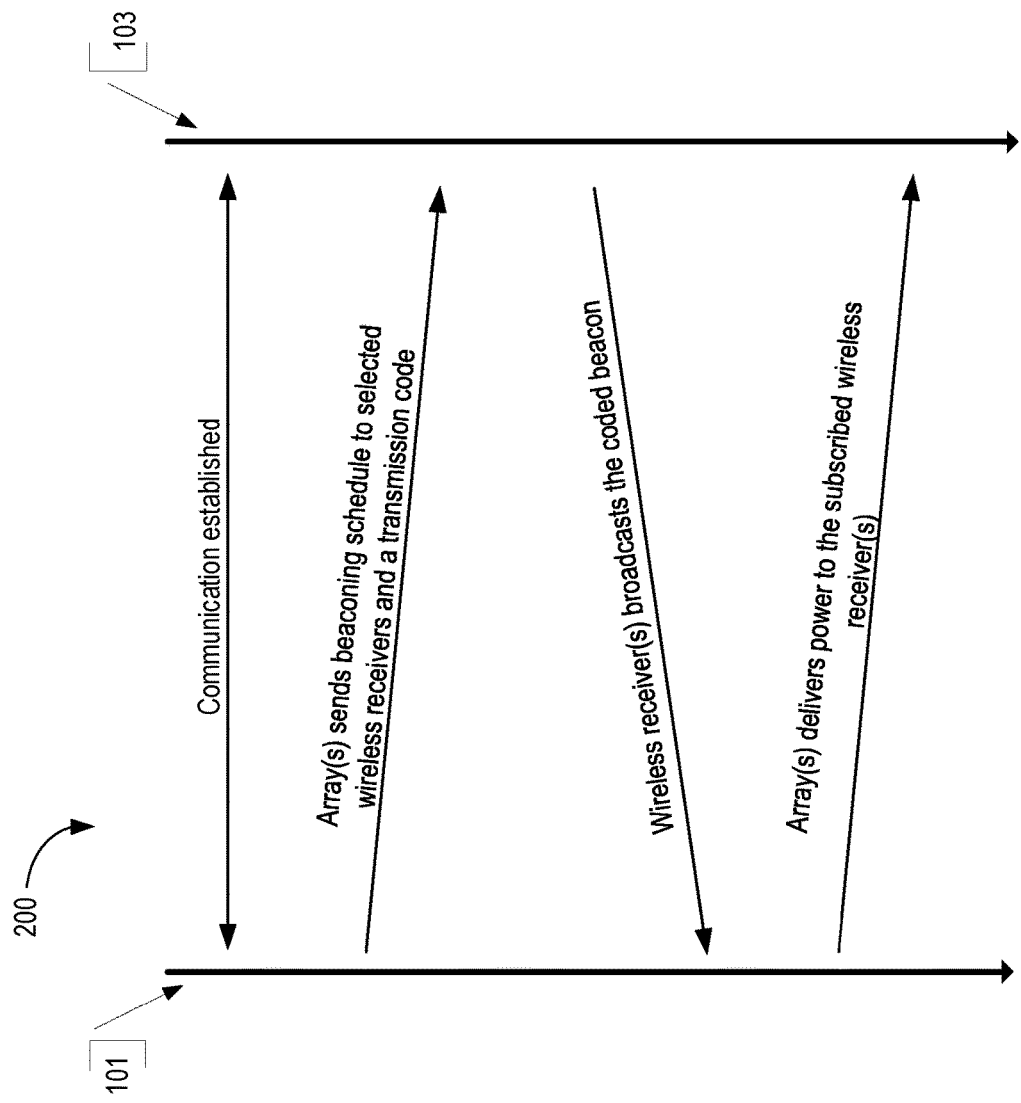
FIG. 2 depicts a sequence diagram illustrating example operations between a wireless charger and a wireless receiver device for commencing wireless power delivery in accordance with some embodiments.

FIG. 2 is a sequence diagram 200 illustrating example operations between a wireless charger 101 and a power receiver client 103 for commencing isolated wireless power delivery, according to an embodiment. Initially, communication is established between the charger 101 and the power receiver client 103. The charger 101 subsequently sends beacon schedule information and a transmission code to the power receiver client 103 to facilitate encoding of the beacon signal by the power receiver client 103 for subsequent isolated wireless power delivery by the charger. The charger 101 can also send power transmission scheduling information so that the power receiver client 103 knows when to expect wireless power from the charger. As discussed herein, the power receiver client 103 generates an encoded beacon signal using the transmission code and broadcasts the encoded beacon during a beacon transmission assignment indicated by the beacon schedule information, e.g., BBS cycle.

As shown, the charger 101 receives the beacon from the power receiver client 103 and decodes the encoded beacon signal using the transmission code provided to the client 103 to ensure that the client 103 is an authorized or selected client. The charger 101 also detects the phase (or direction) at which the beacon signal is received and, once the charger determines that the client is authorized, delivers wireless power and/or data to the power receiver client 103 based the phase (or direction) of the received beacon. In some embodiments, the charger 101 can determine the complex conjugate of the phase and use the complex conjugate to deliver and/or otherwise direct wireless power to the power receiver client 103 in the same direction (or phase) in which the beacon signal was received from the power receiver client 103.

In some embodiments, the charger 101 includes many antennas; one or more of which are used to deliver power to the power receiver client 103. The charger 101 can detect phases at which the beacon signals are received at each antenna. The large number of antennas may result in different coded beacon signals being received at each antenna of the charger 101. The charger may then determine the complex conjugate of the beacon signals received at each antenna. Using the complex conjugates, one or more antenna may emit a signal that takes into account the effects of the large number of antennas in the charger 101. In other words, the charger 101 emits a signal from one or more antennas in such a way as to create an aggregate signal from the one or more of the antennas that approximately recreates the waveform of the beacon in the opposite direction.

As discussed herein, wireless power can be delivered in power cycles defined by power schedule information. A more detailed example of the signaling required to commence wireless power delivery is described now with reference to FIG. 3.

Figure 3:
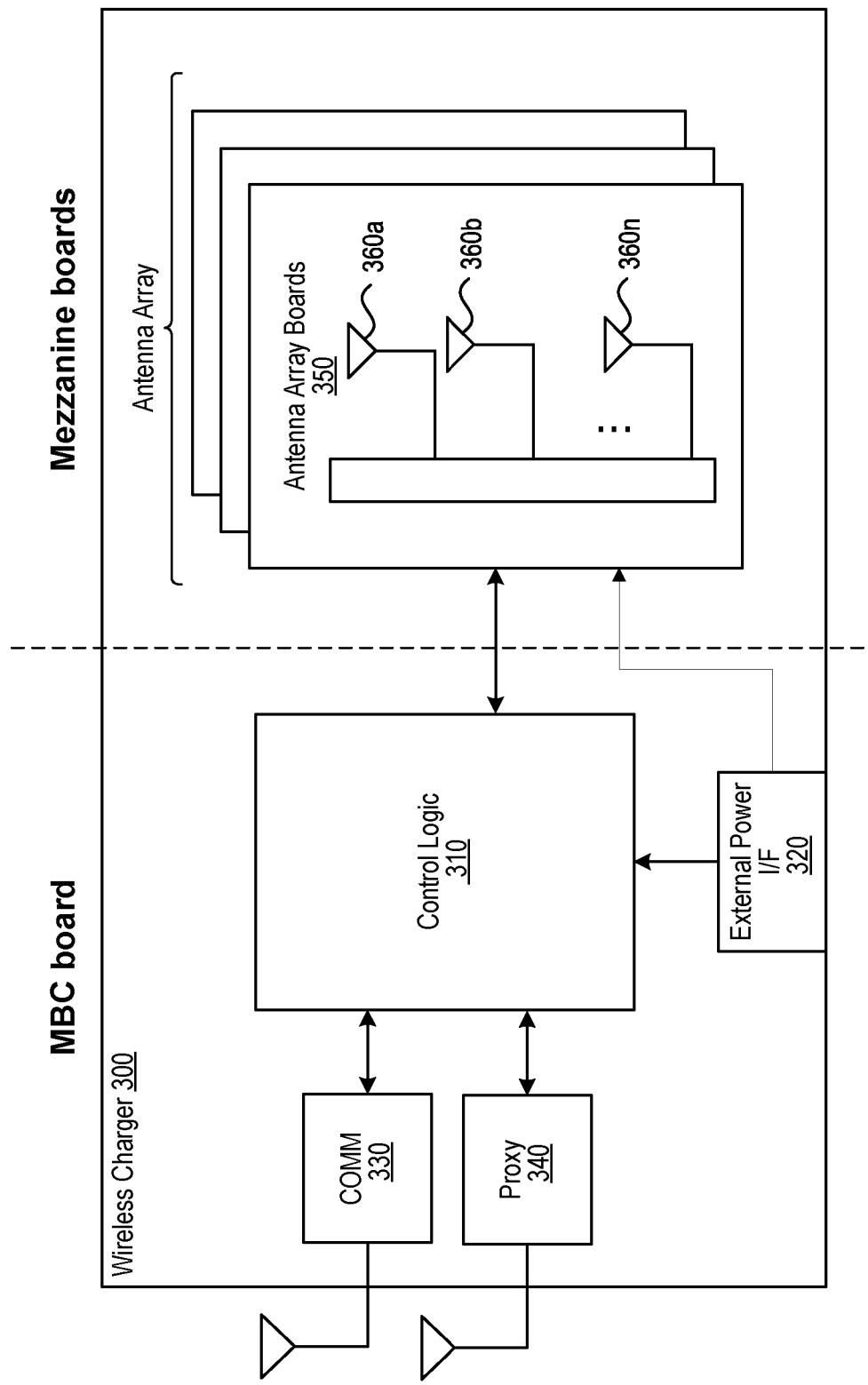
FIG. 3 depicts a block diagram illustrating example components of a wireless power transmitter (charger or wireless power delivery system) in accordance with some embodiments.

FIG. 3 is a block diagram illustrating example components of a wireless charger 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external power interface (I/F) 320, a communication block 330, and proxy 340. The mezzanine (or antenna array boards 350) each include multiple antennas 360a-360n. Some or all of the components can be omitted in some embodiments. Additional components are also possible.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, ZigBee, etc. Likewise, the proxy 340 can communicate with clients via data communications as discussed herein. The data communications can be Bluetooth, Wi-Fi, ZigBee, etc. The external power interface 320 is configured to receive external power and provide the power to various components. In some embodiments, the external power interface 320 may be configured to receive a standard external 24 Volt power supply. Alternative configurations are also possible.

An example of a system power cycle is now described. In this example, the master bus controller (MBC), which controls the charger array, first receives power from a power source and is activated. The MBC then activates the proxy antenna elements on the charger array and the proxy antenna elements enter a default "discovery" mode to identify available wireless receiver clients within range of the charger array. When a client is found, the antenna elements on the charger array power on, enumerate, and (optionally) calibrate.

Next, the MBC generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. A graphical signaling representation of an example BBS and PS is shown and discussed in greater detail with reference to FIGS. 6 and 7. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise the PS indicates when and to which clients the array should send power to. Each client starts broadcasting its beacon and receiving power from the array per the BBS and PS. The Proxy can concurrently query the Client Query Table to check the status of other available clients. A client can only exist in the BBS or the CQT (e.g., waitlist), but not in both. In some embodiments, a limited number of clients can be served on the BBS and PS (e.g., 32). Likewise, the CQT may also be limited to a number of clients (e.g., 32). Thus, for example, if more than 64 clients are within range of the charger, some of those clients would not be active in either the BBS or CQT. The information collected in the previous step continuously and/or periodically updates the BBS cycle and/or the PS.

Figure 4:
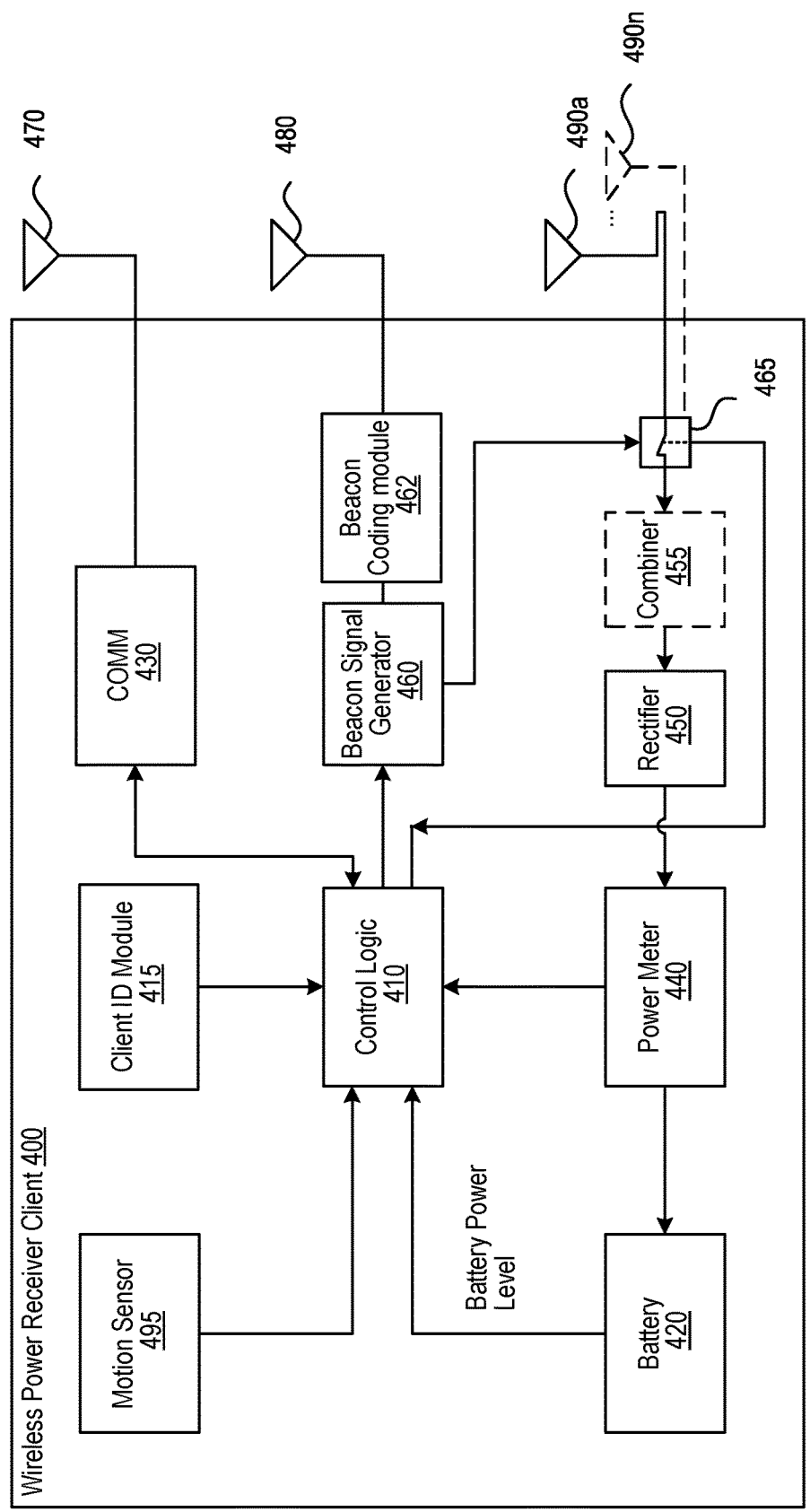
FIG. 4 depicts a block diagram illustrating example components of a wireless power receiver (client) in accordance with some embodiments.

FIG. 4 is a block diagram illustrating example components of a wireless power receiver (client), in accordance with some embodiments. As illustrated in the example of FIG. 4, the receiver 400 includes control logic 410, battery 420, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver is embedded. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. The power meter 440 measures the received power signal strength and provides the control logic 410 with this measurement.

The control logic 410 also may receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown for as charged by and providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, a client identifier (ID) module 415 stores a client ID that can uniquely identify the power receiver client in a wireless power delivery environment. For example, the ID can be transmitted to one or more chargers when communication are established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

II. Embedded or Deposited Surface Antennas

The techniques described herein allow existing objects or devices to be integrated with wireless power facilities. For example, the techniques described herein allow antennas to be embedded and/or otherwise deposited onto the surface of an object or device. In some embodiments, an existing object or device can be integrated with wireless power transmission or reception facilities that enable the object or device to perform wireless charging functions of a discrete wireless power transmission or reception system through the use of the embedded or deposited surface antennas.

As discussed herein, in order to operate efficiently, wireless chargers typically include hundreds or thousands of antennas that are spatially arrayed over a large surface area and exposed to air and/or otherwise lacking significant wireless or EMF interference. The techniques described herein provide for the ability to embed and/or otherwise deposit the thousands of spatially arrayed surface antennas on the surface of a device such that the antennas are exposed to air and/or otherwise lacking significant interference.

The existing objects can include any object having a sufficiently large surface area. By way of example, and not limitation, the existing objects can include televisions or monitors, household appliances, windows (e.g., in homes, businesses and/or vehicles), walls, furniture or furnishings, etc.

In some embodiments, the techniques described herein utilize the surface and/or screen of an existing device such as, for example, a television, as a wireless charger. In some embodiments, other surfaces of these existing devices can also be utilized for embedding and/or depositing antennas. For example, the antennas can be embedded around the plastic perimeter of a television or on the back plastic surface of a television. Accordingly, among other benefits, the techniques described herein generally replace stand-alone or discrete wireless chargers with wireless chargers that are built and/or otherwise embedded in existing devices having a primary function unrelated to wireless charging.

In some embodiments, the antennas can be embedded or deposited onto the surface of an existing object using techniques similar to the current techniques used for capacitive touchscreens. For example, a capacitive touchscreen panel consists of an insulator such as glass, coated with a transparent conductor such as indium tin oxide (ITO). In some embodiments, the layers are deposited such that they are thin and transparent.

In some embodiments, the wireless power transmission systems discussed herein refer to radio frequency (RF) wireless power (and data) delivery systems. One unique compact charger design is discussed in U.S. patent application Ser. No. 14/461,332, which is included by reference in its entirety herein. More specifically, U.S. patent application Ser. No. 14/461,332 discusses a high dielectric antenna with a reduced form factor. The high dielectric antenna can include various plates (or antenna elements) that collectively include thousands of antennas. The placement of the antennas and the plates in the system provide for a reduction in the form factor (or physical size) of a wireless power charger system.

Figure 5A:
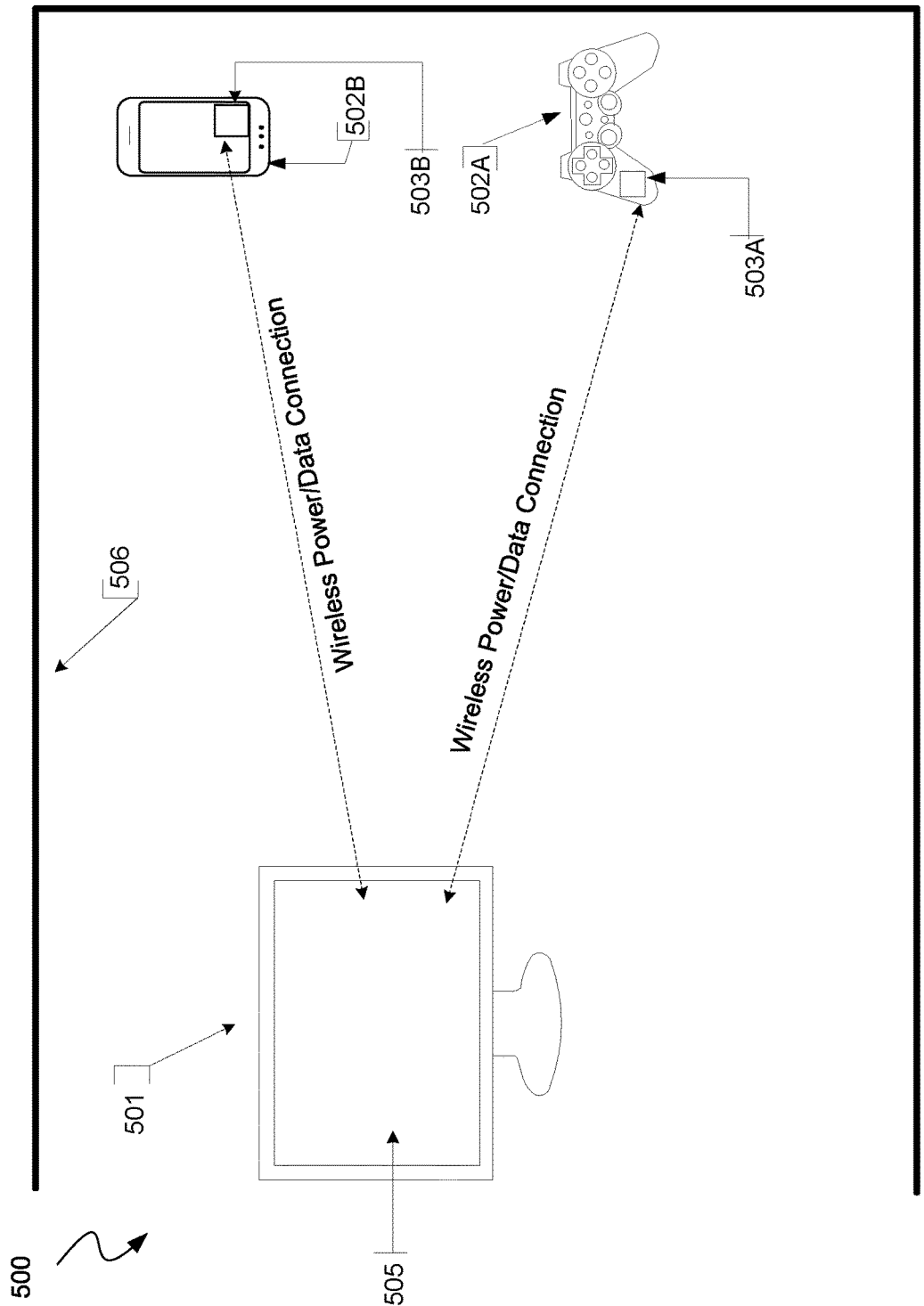
FIG. 5A is a diagram illustrating an example environment in which wireless power/data is delivered to available clients via an existing object having embedded or deposited surface antennas in accordance with some embodiments.

FIG. 5A is a diagram illustrating an example environment 500 in which wireless power/data is delivered to available clients 502A and 502B via an existing object 501 having embedded or deposited surface antennas. More specifically, in the example of FIGS. 5A and 5B, the existing object 501 is a display device such as, for example, a television or a monitor device having a glass front antenna. As shown in the example of FIG. 5B, the display device 501 has optically transparent antennas 504 constructed on a screen or glass substrate 505. In some embodiments, the display device 501 is configured to receive beacon signals from wireless devices in the wireless power delivery environment 500, e.g., wireless devices 502A and 502B having wireless power receiver clients 503A and 503B respectively, and to deliver power/data signals to the wireless devices.

In some embodiments, surface antennas can alternatively or additionally be embedded and/or otherwise deposited on one or more of the wireless devices 502A and 502B. As discussed herein, the embedded antennas can be placed anywhere on the wireless devices 502A and 502B, e.g., the housing or the glass screen, etc.

Various examples of deposition of the surface antennas onto a glass substrate is shown and discussed in greater detail with reference to FIGS. 4 and 5. As discussed in the example of FIG. 5A, the glass front antenna is capable of receiving the beacon from the wireless devices 502A and 502B and responsively delivering a power signal to the corresponding wireless device 502A and 502B during a power transmission schedule assigned to the wireless device.

As shown in the example of FIG. 5B, the antennas can be deposited, placed and/or otherwise embedded on the screen 505 of the display device 501. The antennas 504 can be placed anywhere on the display device 501. An example of the placement of the various placement of antennas in an existing object is discussed in greater detail with reference to FIG. 5B.

FIG. 5B illustrates a more detailed example of the display device 501, according to some embodiments. In the example of FIG. 5B, display device 501 is shown with an embedded wireless power controller 510 that is configured to control transmission of data and/or power from antennas 504. The geometry and configuration of the antennas 504 can be designed in a variety of ways. Some example designs are shown and discussed in greater detail with reference to U.S. Provisional Patent Application No. 62/100,007 which is incorporated by reference herein.

Figure 6:
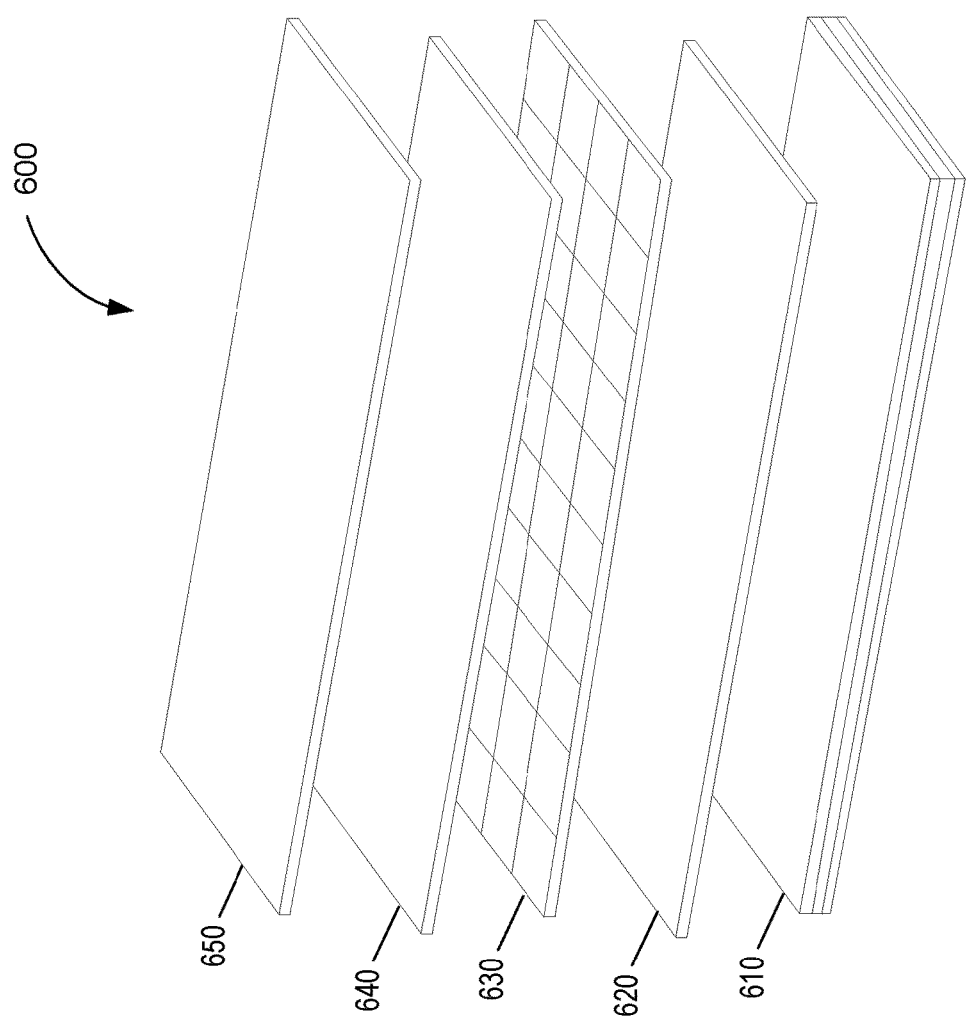
FIG. 6 is a diagram illustrating an exploded view of an example antenna built, deposited and/or otherwise embedded into a surface of an existing device to create or add a wireless charging functionality in the existing device in accordance with some embodiments.

FIG. 6 is a diagram illustrating an exploded view of an example antenna 600 built, deposited on, embedded into and/or otherwise carried by a surface of an existing device to create or add a wireless facility to an existing device. As described herein, in some embodiments, the antennas are deposited on the surface of an existing object such that the object can function as a wireless power delivery system or wireless power reception system in addition to retaining its primary functionality. More specifically, the example of FIG. 6 illustrates depositing and/or otherwise embedding surface antennas onto a screen of an existing device such as a television, monitor or mobile device screen, according to some embodiments.

The deposited surface antennas are both thin and transparent. Various techniques and materials can be used to deposit the surface antennas. In some embodiments, a technique is described for embedding and/or otherwise depositing thin and transparent antennas on the surface of a television. For example, antennas may be deposited on the surface or the screen of existing devices such as, for example, a television. Alternatively, or additionally, the antennas can be embedded around the plastic perimeter of a television or on the back plastic surface of a television.

In some embodiments, the antennas can be embedded or deposited onto the surface of an existing object using techniques similar to the current techniques used for capacitive touchscreens. For example, a capacitive touchscreen panel consists of an insulator such as glass, coated with a transparent conductor such as indium tin oxide (ITO). As the human body is also an electrical conductor, touching the surface of the screen results in a distortion of the screen's electrostatic field, measurable as a change in capacitance. With capacitive touchscreen various technologies can be used to determine the location of the capacitive touch. For example, a driving and sensing capacitive grid can include horizontal driving lines (or wires) that sit on top of vertical sensing lines (or wires). The capacitive grid can include hundreds of wires. When a capacitive touch is detected a location is determined. Once the location is determined, it is sent to a touchscreen controller for processing.

In some embodiments, when the antennas are embedded or deposited onto the surface of a television or monitor using an insulator such as glass coated with a transparent conductor such as ITO, the television or monitor can achieve get almost one-to-one antenna density versus a printed circuit board (PCB) material with the ITO.

In most instances, the use of ITO to embed or deposit antennas on a surface results in a problem in that ITO materials are more resistive than typical antenna materials, e.g., copper wiring. Accordingly, a high voltage antenna design can be utilized such that the impedance is taken into account as part of the antenna design. Thus, it is possible to get more power through it without dissipating the power into heat. It is appreciated that the high voltage design typically reaches volts rather than millivolts. Typically, if you have high impedance antennas the current is high because once the electrons start moving, they feel the resistance. Less electron movement results in a higher the efficiency.

In some embodiments, the high voltage antenna design, while essentially operating in Volts, results in little or no interference because the antennas (or emitters) essentially operate in Milo watts at any location around the emitter—which is not enough power to cause interference.

As shown in the example of FIG. 6, a surface layer 610 is a surface or base layer. For example, the surface layer 610 can be an LCD (Liquid Crystal Display) or an LED (Light Emitting Diode) television display, monitor or mobile device display. A glass layer 620 is deposited and/or otherwise placed on top of the surface layer 610. Next, an antenna layer 630 is embedded and/or deposited with a transparent conductor such as indium tin oxide (ITO). The antenna layer 630 can include thousands of antennas. In some embodiments, the antenna layer 630 can also function as a capacitive grid. In such cases, the antennas can be embedded or deposited as driving lines and/or sensing lines.

A protective cover layer 640 can optionally be placed on top of the antenna layer 630. In some embodiments, the protective cover layer 640 can be comprised of a flexible clear material. Lastly, a surface layer 650 can be embedded and/or otherwise applied. In some embodiments, the surface coating layer 650 can include various anti-reflective properties. While FIG. 6 shows certain layers, alternative implementations can include fewer layers, more layers, or layers in a different order than presented in FIG. 6.

Figure 7:
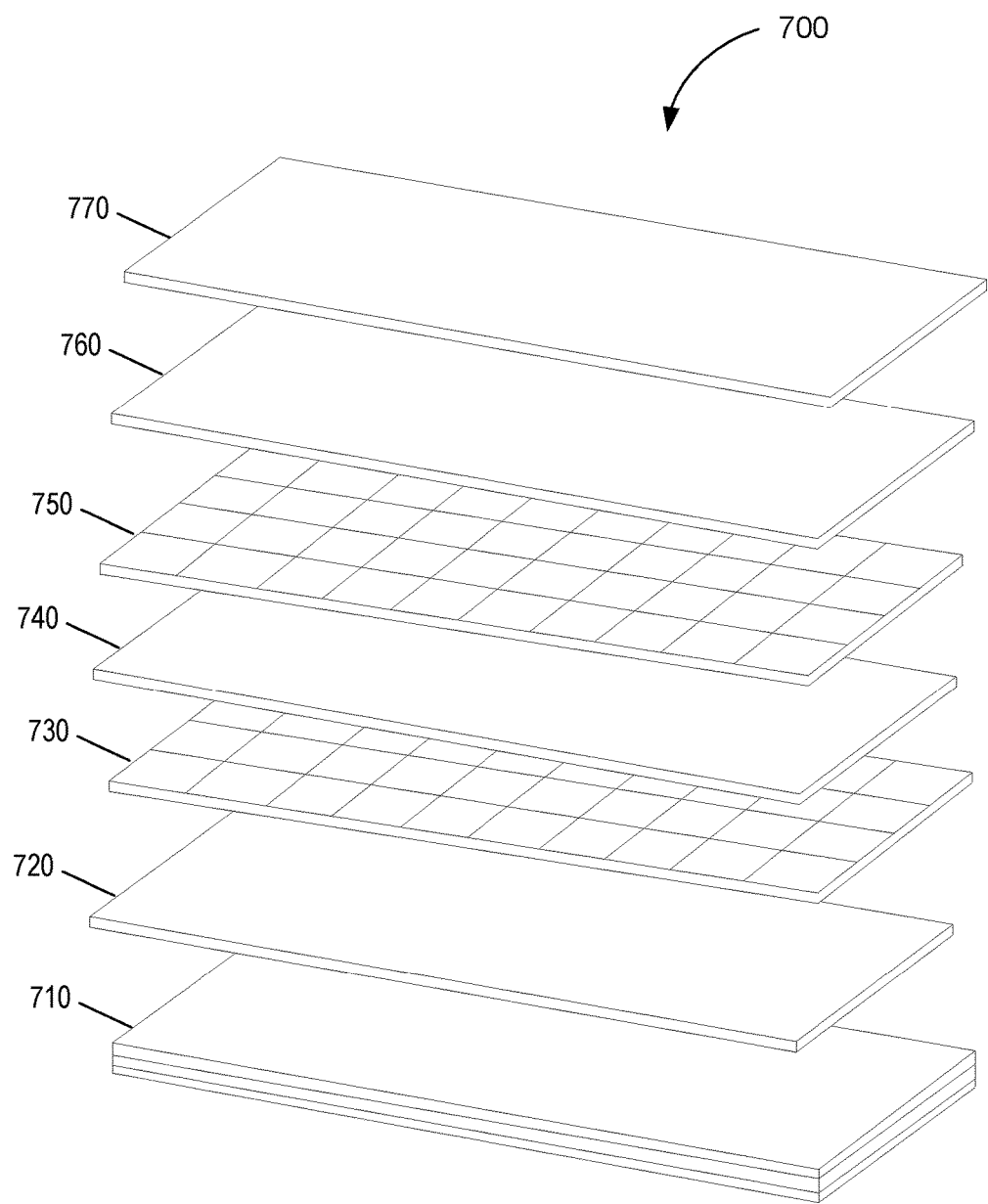
FIG. 7 is a diagram illustrating an exploded view of another example antenna built, deposited and/or otherwise embedded into a surface of an existing device to create or add a wireless charging functionality in the existing device in accordance with some embodiments.

FIG. 7 is a diagram illustrating an exploded view of an example antenna 700 built, deposited and/or otherwise embedded into a surface of an existing device to create or add a wireless charging functionality in the existing device.

In the example of FIG. 7, a glass layer 720 is deposited and/or otherwise placed on top of the surface layer 710. For example, the surface layer 710 can be an LCD (Liquid Crystal Display) or an LED (Light Emitting Diode) for a television, monitor or mobile device display. The existing device includes a touchscreen layer 730 (e.g., driving and sensing capacitive grid) as well as a deposited antenna layer 750 separated by at least one protective layer 740. The protective layer can be, for example a glass layer.

A protective cover layer 760 can optionally be placed on top of the antenna layer 750. In some embodiments, the protective cover layer 760 can be comprised of a flexible clear material. Lastly, a surface layer 770 can be embedded and/or otherwise applied. In some embodiments, the surface coating layer 770 can include various anti-reflective properties. While FIG. 7 shows certain layers, alternative implementations can include fewer layers, more layers, or layers in a different order than presented in FIG. 7.

Figure 8:
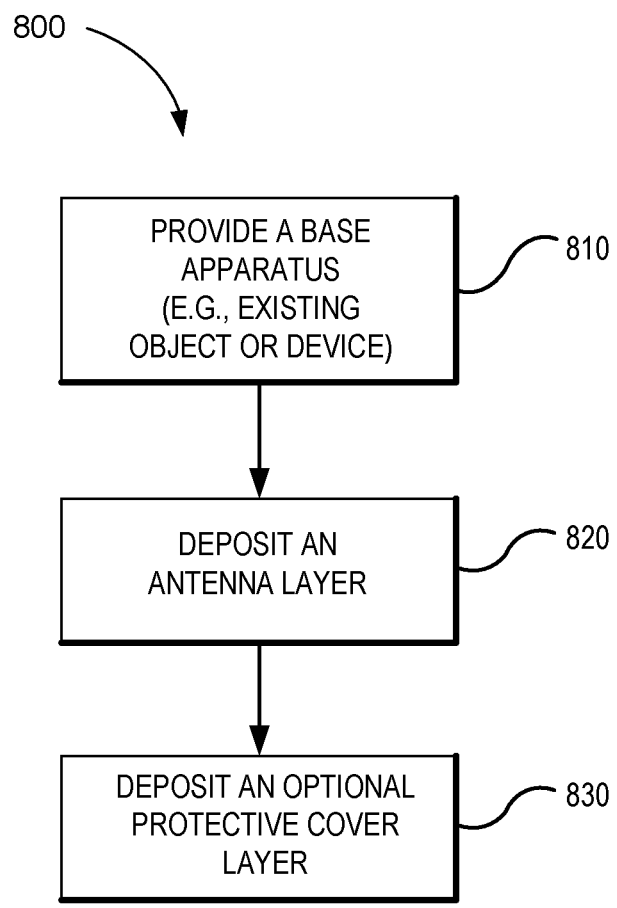
FIG. 8 is a flow diagram illustrating an example process for embedding and/or otherwise depositing surface antennas in an existing device or object having a primary function other than wireless charging in accordance with some embodiments.

FIG. 8 is a flow diagram illustrating an example process 800 for embedding and/or otherwise depositing surface antennas onto an existing device or object having a primary function other than wireless charging, according to some embodiments.

As shown in the example of FIG. 8, the process begins at step 810 by providing a base apparatus. As discussed herein, the base apparatus is configured to perform a primary non-wireless power related function. By way of example and not limitation, the base apparatus can be a display apparatus (e.g., television, monitor, or screen), a household appliance or electronic device, a window, a wall, or furniture and/or furnishings. In some embodiments, the base apparatus includes a glass substrate layer upon which an antenna layer can be deposited in step 820. Lastly, an optional protective layer can be deposited at step 830.

Figure 9:
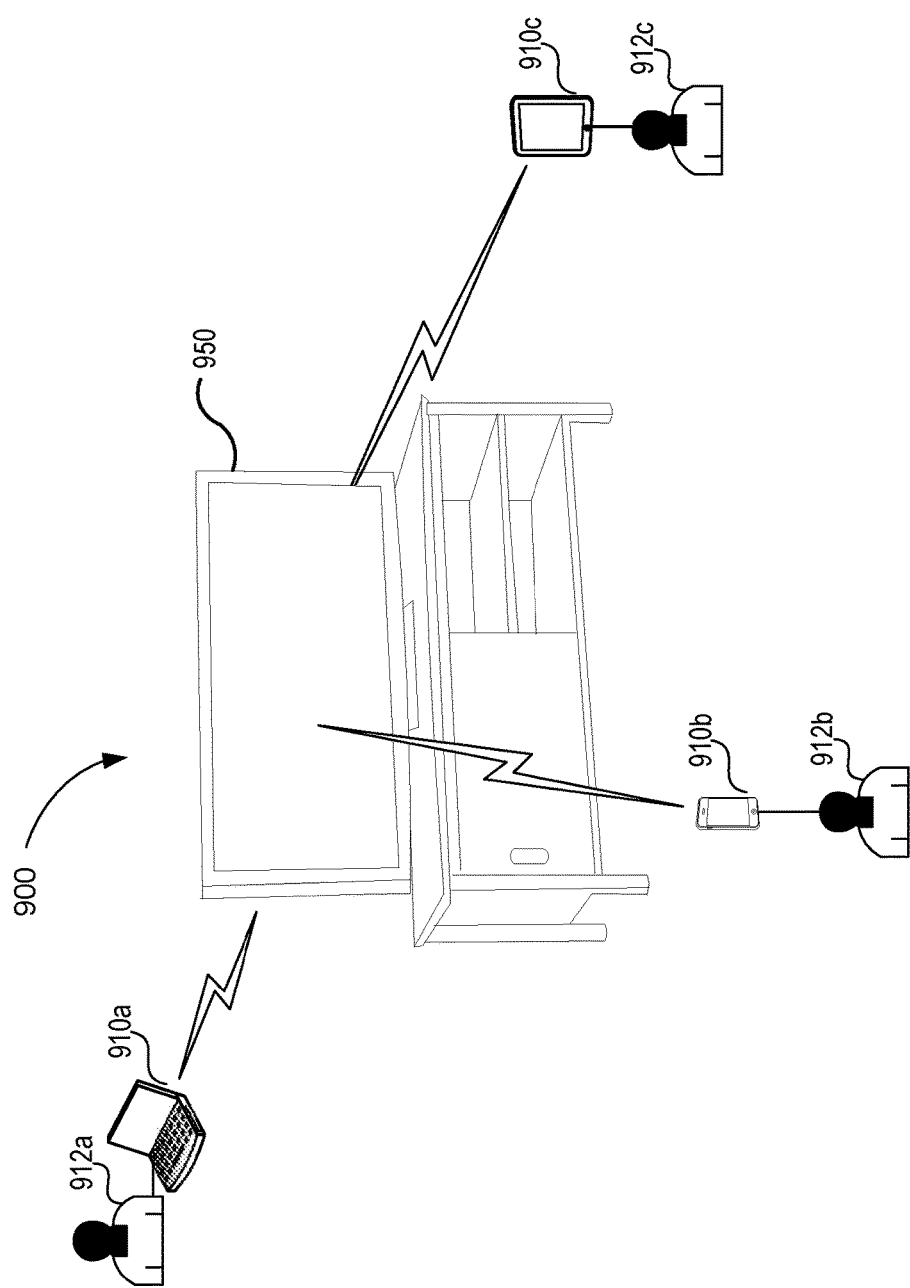
FIG. 9 is a diagram illustrating an example environment for wireless power delivery via a television having embedded or deposited antennas in accordance with some embodiments.

FIG. 9 is a diagram illustrating an example environment 900 for wireless power delivery via a television 950 having embedded or deposited surface antennas as discussed herein, according to some embodiments. Specifically, the example of FIG. 9 illustrates antennas embedded in the front screen of the television 950 as well as around the plastic perimeter of the television 950 and on the back (or rear) plastic surface of a television. Advantageously, the antennas built in the front screen or the surface of the television 950 as well as around the plastic perimeter of the television 950 provides for wireless power delivery to client devices 912A-C in a wider range and can result in a reduction in the special absorption rate.

In some embodiments, one of the problems with putting antennas in a plane is that it can create a reflective image on the other side of the plane. However, some devices such as, for example, LCD and LED displays have a ground plane behind the screen. Consequently, in some embodiments, the ground plane can be used to isolate the antenna layers e.g., the antennas embedded in the screen and in the rear of the television. Advantageously, the systems and methods described herein allow the antennas to be embedded not only in the front screen of the television 950, but also around the plastic perimeter of the television 950 and on the back plastic surface of a television.

Although the example of FIG. 9 illustrates antennas embedded or deposited in television 950 to create a wireless embedded charger, a wireless charger can be embedded in almost any surface including, but not limited to, walls, appliances, windows, video game systems, furniture and/or furnishings, etc. Additionally, in some embodiments, radio frequency (RF) tags can be integrated into the power delivery systems on the existing device. For example, in some embodiments, RF tags with embedded antennas can be placed on the exterior of a television or monitor to provide power delivery to clients located behind the television or monitor.

Figure 10:
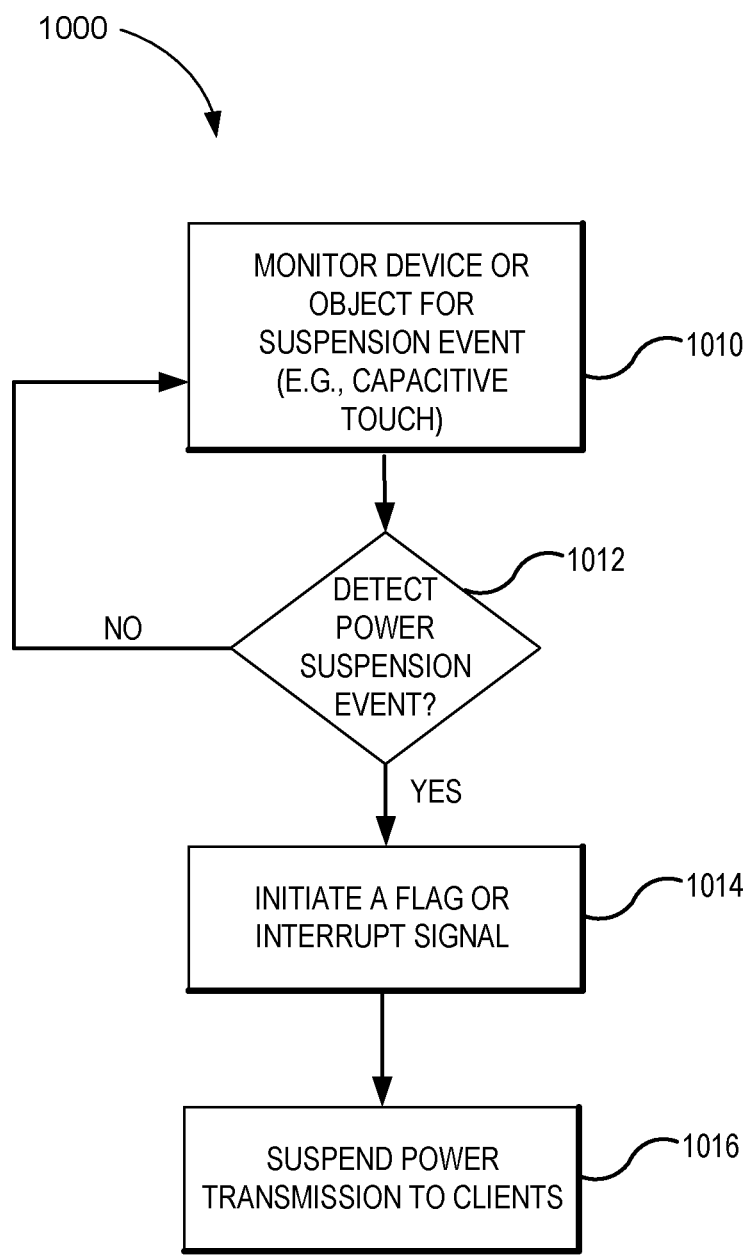
FIG. 10 is a flow diagram illustrating an example process for suspending wireless power transmission to clients and/or suspending wireless power reception at the clients in accordance with some embodiments.

FIG. 10 is a flow diagram illustrating an example process 1000 for suspending wireless power transmission to clients and/or suspending wireless power reception at the clients, according to various embodiments.

In some embodiments, a capacitive touch screen (or touch screen controller) utilizes software algorithms to determine where a capacitive touch or multi-touch occurred on the capacitive touch screen. In some instances, the capacitive touch screen (or touch screen controller) can further include an application program interface (API) that can, among other functions, detect a capacitive touch (or eminent capacitive touch) and provide this information to an embedded wireless power controller that is configured to control transmission of data and/or power from the embedded or deposited antennas. Alternatively, or additionally, the embedded wireless power controller can be otherwise configured to detect the capacitive touch or detect likely use of the touchscreen via one or more onboard sensors, e.g., accelerometers, etc.

According the example of FIG. 10, at a monitoring step 1010, the touch screen controller and/or the embedded wireless power controller monitors the device on which the antennas are embedded for a suspension event. The suspension event can be, for example, a capacitive touch or multi-touch, an accelerometer or other sensor event, etc.

At a decision step 1012, the touch screen controller and/or the embedded wireless power controller detects a suspension event. As discussed, the suspension event can be a capacitive touch or multi-touch event. In some examples of FIG. 10, the existing device on which antennas are embedded or deposited includes a capacitive touchscreen having components that detect when a capacitive touch occurs. More specifically, as discussed above, a capacitive touchscreen typically includes an insulator such as glass, coated with a transparent conductor such as indium tin oxide (ITO). As the human body is an electrical conductor, touching the surface of the screen results in a distortion of the screen's electrostatic field, measurable as a change in capacitance. Various technologies can be used to determine the location of the capacitive touch. For example, a driving and sensing capacitive grid can include horizontal driving lines (or wires) that sit on top of vertical sensing lines (or wires). The capacitive grid can include hundreds of wires. When a capacitive touch is detected a location is determined. Once the location is determined, it is sent to a touchscreen controller for processing. In some cases, the capacitive touch screen utilizes software algorithms to determine where the touch or the multi-touch occurred on the screen.

In some embodiments, an application program interface (API) can be built into the touch screen device. Among other functions, the API can detect a capacitive touch (or eminent capacitive touch) and provide this information to an embedded wireless power controller that is configured to control transmission of data and/or power from the embedded or deposited antennas.

At an indication step 1014, the touch screen controller and/or the embedded wireless power controller initiate a flag or an interrupt signal indicating that the transmission of power should be suspected. Lastly, at a suspension step 1016, the touch screen controller and/or the embedded wireless power controller suspend power transmission. As discussed herein, wireless power transmission is typically a continuous wave. But as can be seen in the process of FIG. 10, the default is to provide power transmission continuously until an interrupt is detected.

Figure 11:
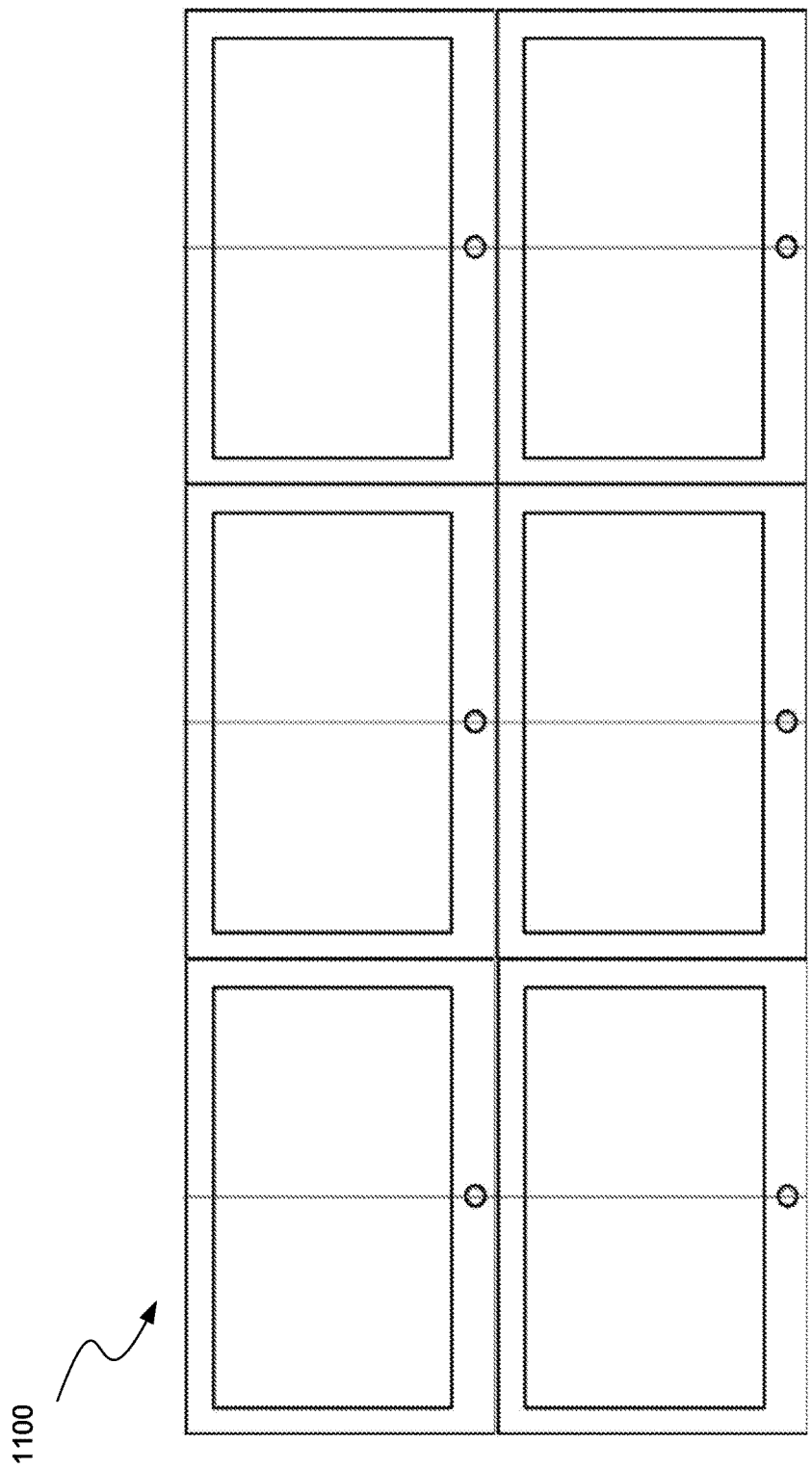
FIG. 11 is a diagram illustrating a multi-panel television array having embedded or deposited surface antennas for wireless power delivery in accordance with some embodiments.

FIG. 11 is a diagram illustrating a multi-panel television array 1100 having embedded or deposited surface antennas for wireless power delivery, according to an embodiment. The multi-panel television array 1100 can be located at, for example an airport to display flight information.

Figure 12A:
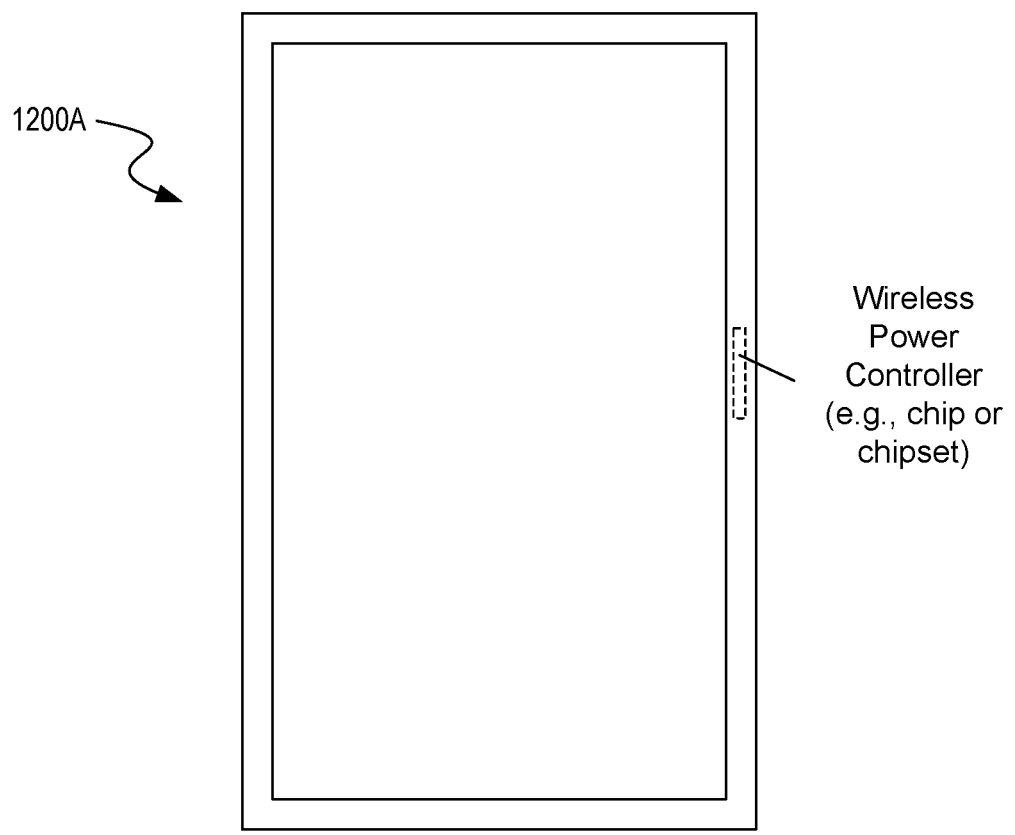
FIGS. 12A and 12B are diagrams illustrating windows having embedded or deposited surface antennas for wireless power delivery in accordance with some embodiments.
Figure 12B:
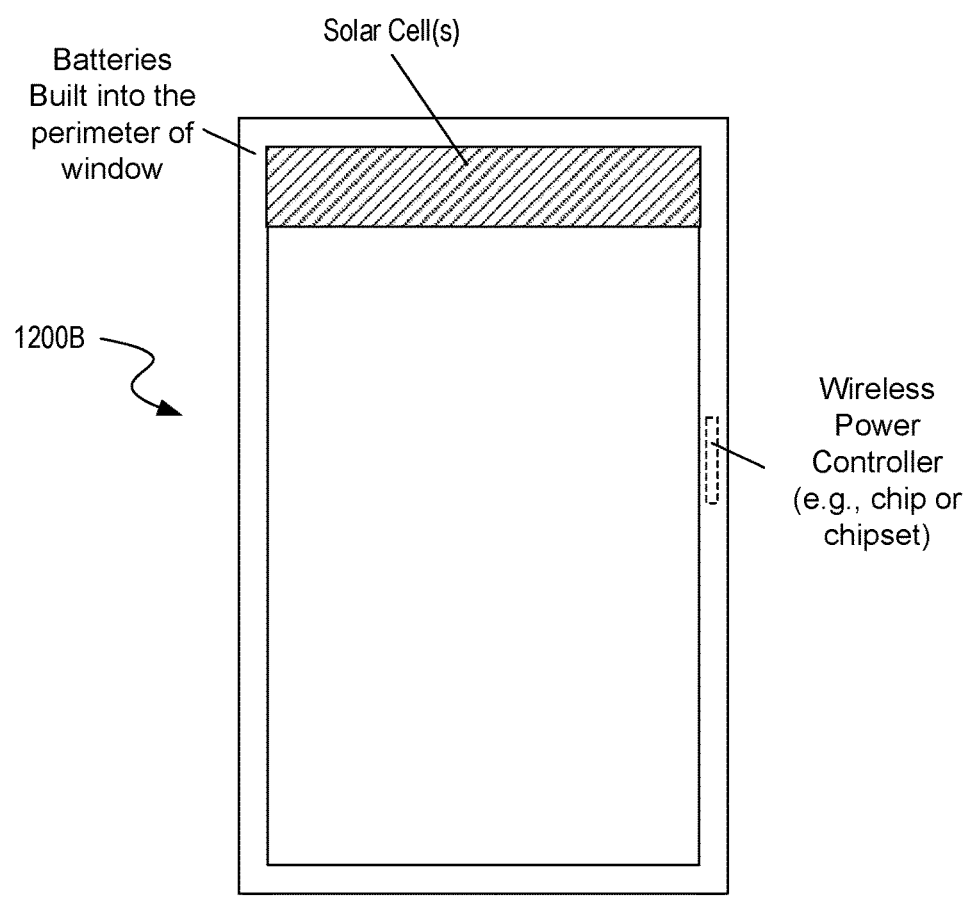

FIGS. 12A and 12B are diagrams illustrating windows having embedded or deposited surface antennas for wireless power delivery, according to some embodiments. The example of FIG. 12A can include antennas embedded or deposited onto the inner or outer surface of a single pane or multi-pane (e.g., double, triple, etc.) window. Alternatively, or additionally, the antennas can be embedded or deposited inside or within one or more of the window panes. Furthermore, the example of FIG. 12A can include an external power source or plug. Alternatively, one or more built-in battery systems can be utilized. A wireless power controller or chip can also be embedded (e.g., in the frame of the window) to control the wireless power delivery as described herein.

The example of FIG. 12B is similar to the example of FIG. 12A, but also includes one or more solar cells for capturing power and one or more battery systems that can be built- or designed-into the frame of the window or a nearby wall to store the captured energy.

In some embodiments, the antennas can be embedded or deposited into or onto flexible coatings (not shown) that can be retroactively applied to a window. In some instances, the coatings can provide some other functionality. For example, a window tinting could also have embedded or deposited antennas, solar cells or properties, and/or a wireless power controller embedded thereon.

Figure 13:
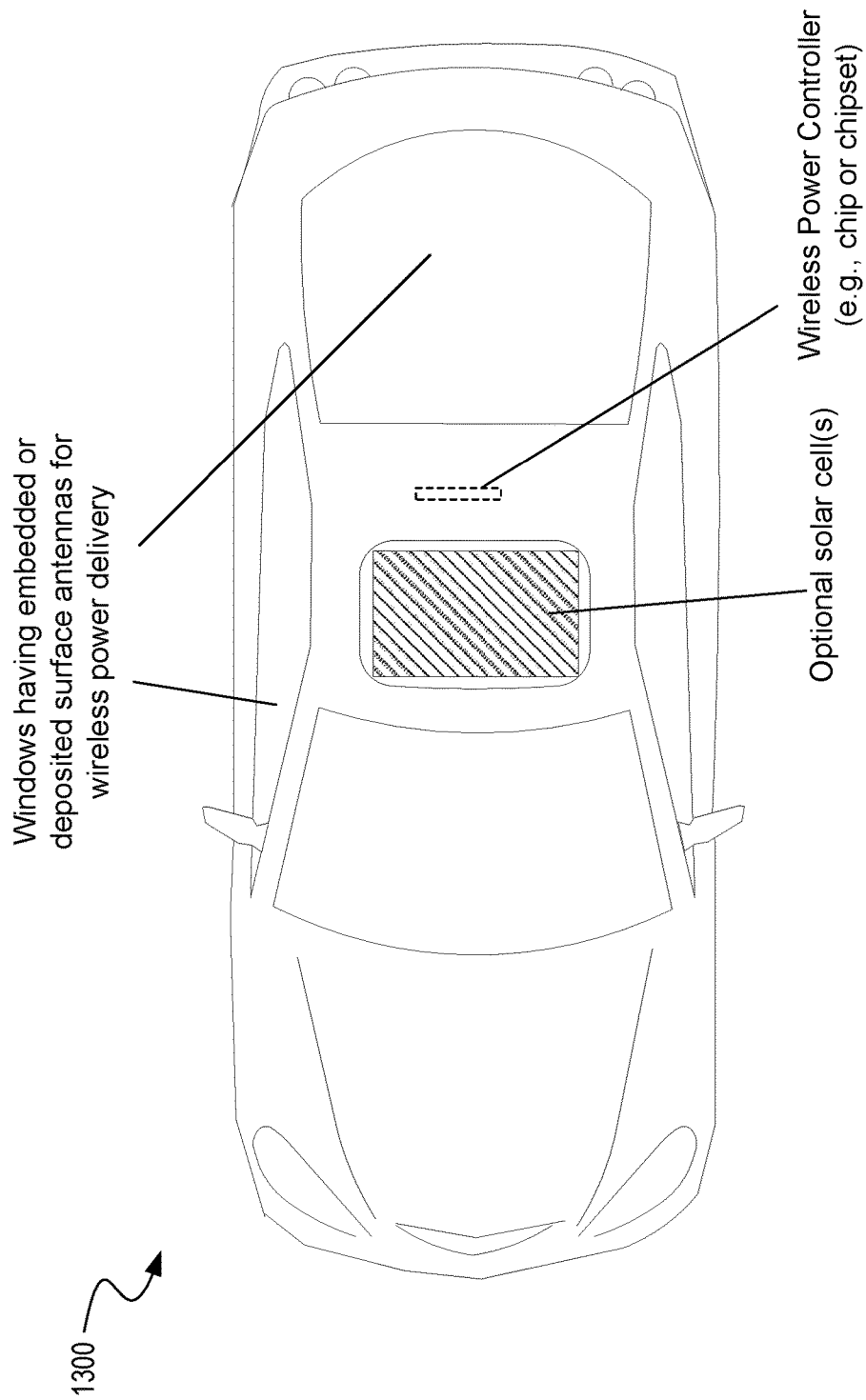
FIG. 13 is a diagram illustrating an example vehicle that has embedded or deposited surface antennas for wireless power delivery in accordance with some embodiments.

FIG. 13 is a diagram illustrating an example vehicle that has embedded or deposited surface antennas for wireless power delivery, according to an embodiment. In some embodiment, the antennas can be embedded in the windows as described in the examples of FIG. 12A and/or 12B. Alternatively or additionally, the antennas and/or other functionality (e.g., solar cells, wireless controller chip, etc.) can be embedded on or within the vehicle.

In some embodiments, one or more solar cells for capturing power and one or more battery systems that can be built- or designed-into the frame of the window or vehicle frame a to store the captured energy. A wireless power chip controller (chip or chipset) can also be included in the vehicle or vehicle frame.

Figure 14A:
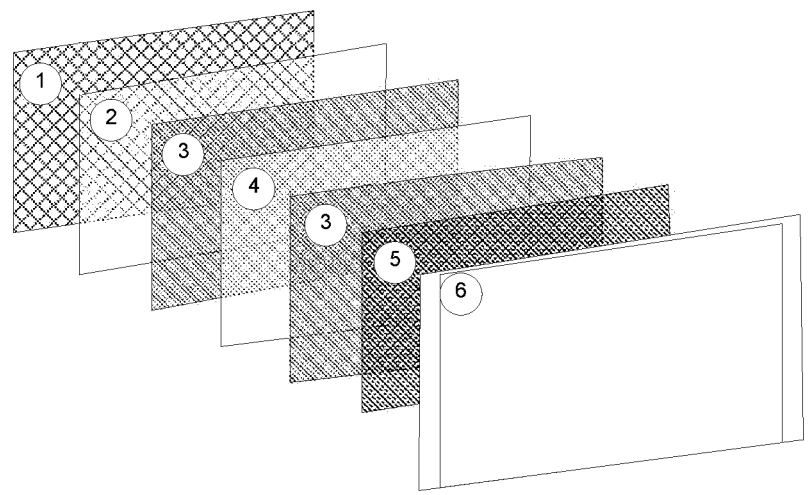
FIG. 14A is a diagram illustrating an example backlight LED television having antennas embedded or deposited between the light emitting diodes LEDs using copper in accordance with some embodiments.

FIG. 14A is a diagram illustrating an example backlight LED television having antennas embedded or deposited between the light emitting diodes LEDs using copper, according to an embodiment. In the example of FIG. 14A, layer 1 comprises an LED backlight using separate LEDS for red, green, and blue. Layer 2 comprises one or more diffusers. Layer 3 comprises one or more polarizers. Layer 4 comprises an LCD panel. Layer 5 comprises an antiglare coating and Layer 6 comprises a display screen. Additional or fewer layers are possible.

Figure 14B:
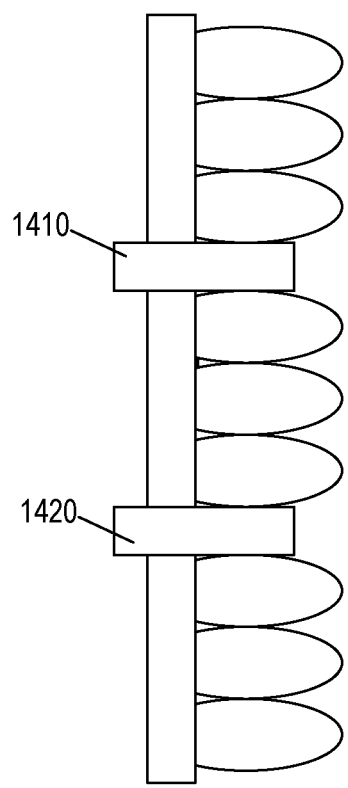
FIG. 14B is a diagram illustrating the individual LEDs with copper antennas embedded or deposited in empty spaces between the LEDs in accordance with some embodiments.

FIG. 14B is a diagram illustrating the individual LEDs with copper antennas 1410 and 1420 embedded or deposited in empty spaces between the LEDs. The copper antennas 1410 and 1420 can collectively function as a high dielectric antenna array as described herein. Advantageously, with this embodiment, copper wiring is used. Because the copper wiring has a low impedance, a high voltage design is not required.

While described above as using ITO, antennas can be created by deposition of carbon nanotubes or a graphene layer (both of which are transparent or invisible to the eye).

Figure 15:
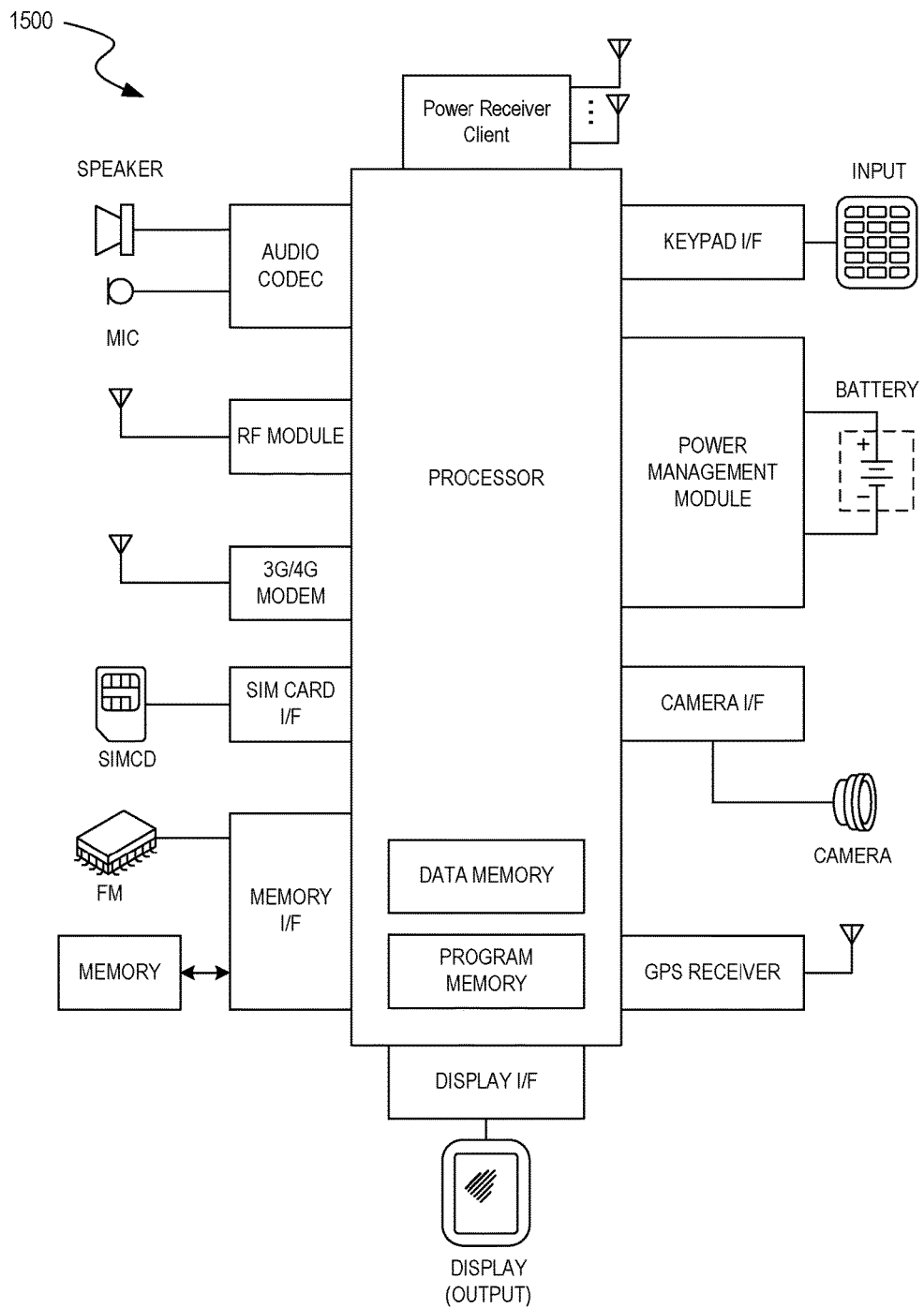
FIG. 15 depicts a block diagram illustrating example components of a representative mobile device or tablet computer with a wireless power receiver or client in the form of a mobile (or smart) phone or tablet computer device, according to some embodiments.

FIG. 15 depicts a block diagram illustrating example components of a representative mobile device or tablet computer 1500 with a wireless power receiver or client in the form of a mobile (or smart) phone or tablet computer device, according to an embodiment. Various interfaces and modules are shown with reference to FIG. 15, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 16:
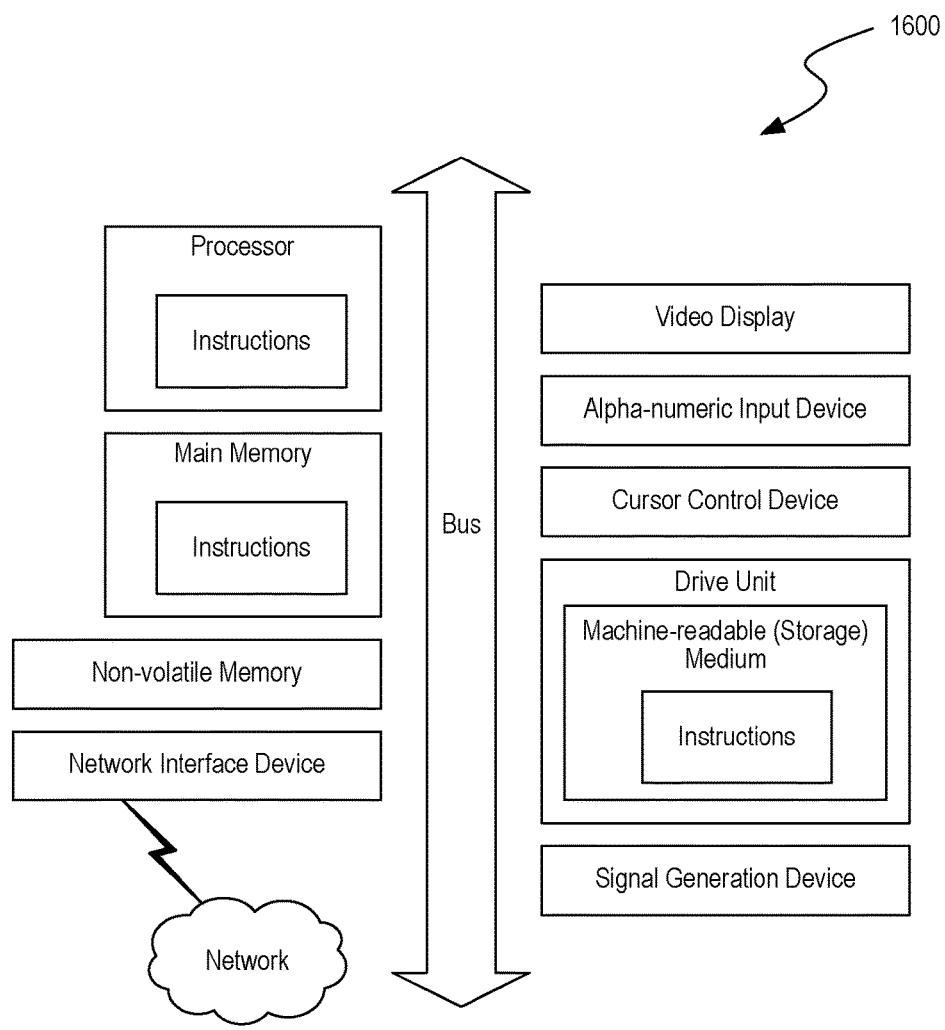
FIG. 16 depicts a diagrammatic representation of a machine, in the example form, of a computer system within which a set of instructions, for causing the machine to perform any one or more of the methodologies discussed herein, may be executed.

FIG. 16 depicts a diagrammatic representation of a machine, in the example form, of a computer system within which a set of instructions, for causing the machine to perform any one or more of the methodologies discussed herein, may be executed.

In the example of FIG. 16, the computer system includes a processor, memory, non-volatile memory, and an interface device. Various common components (e.g., cache memory) are omitted for illustrative simplicity. The computer system 1600 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 16 reside in the interface.

In operation, the computer system 1600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A system having integrated wireless power facilities, the system comprising:
    a base apparatus configured to perform a primary non-wireless power related function, the base apparatus including:
        a display layer;
        an optically transparent glass substrate layer deposited on the display layer; and
        an antenna layer deposited on the glass substrate layer, the antenna layer having multiple antennas that are spatially-arrayed, adaptively phased antennas, and comprised of an optically transparent conductor, wherein a design of the antenna layer is dependent on an impedance of the optically transparent conductor and comprises a one-to-one antenna density versus a printed circuit board (PCB) within a margin of error; and
    a wireless power control system operatively coupled to the multiple antennas,
        wherein the control system is configured to independently control phases of the multiple antennas in a wireless power delivery environment.

2. The system of claim 1, wherein the at least one transparent optically transparent conductor comprises one or more of indium tin oxide (ITO), carbon nanotubes, or a graphene layer.

3. The system of claim 1, wherein the phases of the multiple adaptively phased antennas are controlled for receiving wireless power or for transmitting wireless power in the wireless power delivery environment.

4. The system of claim 1, wherein the base apparatus further includes:
    a housing; and
    an additional antenna layer deposited on the surface of the housing.

5. The system of claim 4, wherein the base apparatus further includes:
    a ground plane that isolates the antenna layer deposited onto the glass substrate layer and the additional antenna layer deposited on the surface of the housing.

6. The system of claim 1, wherein the base apparatus comprises a television or monitor, a household appliance or electronic device, a window, a wall or furniture and/or furnishings.

7. The system of claim 1, wherein the control system is embedded in the base apparatus.

8. The system of claim 1, wherein the display layer comprises a Liquid Crystal Display (LCD) or a Light Emitting Diode (LED) display.

9. The device of claim 1, wherein the multiple adaptively phased antennas are deposited as driving and sensing lines of a capacitive touch grid.

10. The system of claim 1, wherein the wireless power control system is further configured to:
    detect a power suspension event; and
    responsive to the power suspension event, suspend reception or transmission of wireless power in the wireless power delivery environment.

11. The system of claim 10, wherein the suspension event indicates use or eminent use of a touch screen of the base apparatus.

12. The system of claim 1, wherein the base apparatus further includes:
    a transparent protective layer deposited on the antenna layer; and
    a surface layer deposited on the transparent protective layer, wherein the surface layer includes various anti-reflective properties.

13. The device of claim 1, wherein the antenna layer comprises a high voltage design.

14. The system of claim 1, further comprising:
    one or more solar cells configured to capture and convert the solar energy to electrical energy; and
    one or more battery cells configured store the electrical energy,
    wherein operation of the wireless power control system is powered, at least in part, with the electrical energy stored in the one or more battery cells.

15. A system having integrated wireless power facilities, the system comprising:
    a base apparatus;
    multiple adaptively phased antennas deposited onto a surface of the base apparatus,
        wherein the multiple antennas are comprised of an optically transparent conductor, and a design of the multiple antennas is dependent on an impedance of the optically transparent conductor, and wherein the design comprises a one-to-one antenna density versus a printed circuit board (PCB) within a margin of error;

control circuitry operatively coupled to the multiple antennas, the control circuitry configured to independently control phases of the multiple adaptively phased antennas for delivering wireless power to client devices in a wireless power delivery environment;

wherein the base apparatus is configured to perform a primary non-wireless power related function.

16. The system of claim 15, wherein the surface of the base apparatus comprises a glass substrate.

17. The system of claim 16, wherein the at least one transparent optically transparent conductor comprises one or more of indium tin oxide (ITO), carbon nanotubes, or a graphene layer.

18. The system of claim 16, wherein the glass substrate comprises one or more of a window or a display apparatus.

19. A method of forming a phased antenna array on an existing base apparatus, the method comprising:

providing the base apparatus, wherein the base apparatus is configured to perform a primary non-wireless power related function;

depositing, onto a surface of the base apparatus, an antenna layer comprising multiple antenna elements consisting of at least one transparent conductor, wherein the antenna layer comprises the phased antenna array, wherein a design of the antenna layer is dependent on an impedance of the transparent conductor, and wherein the design comprises a one-to-one antenna density versus a printed circuit board (PCB) within a margin of error; and depositing a transparent protective layer onto the antenna layer;

wherein the phased antenna array integrates wireless power facilities onto a base apparatus.

20. The method of claim 19, further comprising:

depositing a surface layer on the transparent protective layer, wherein the surface layer includes various anti-reflective properties.

* * * * *